UNITED STATES PATENT OFFICE.

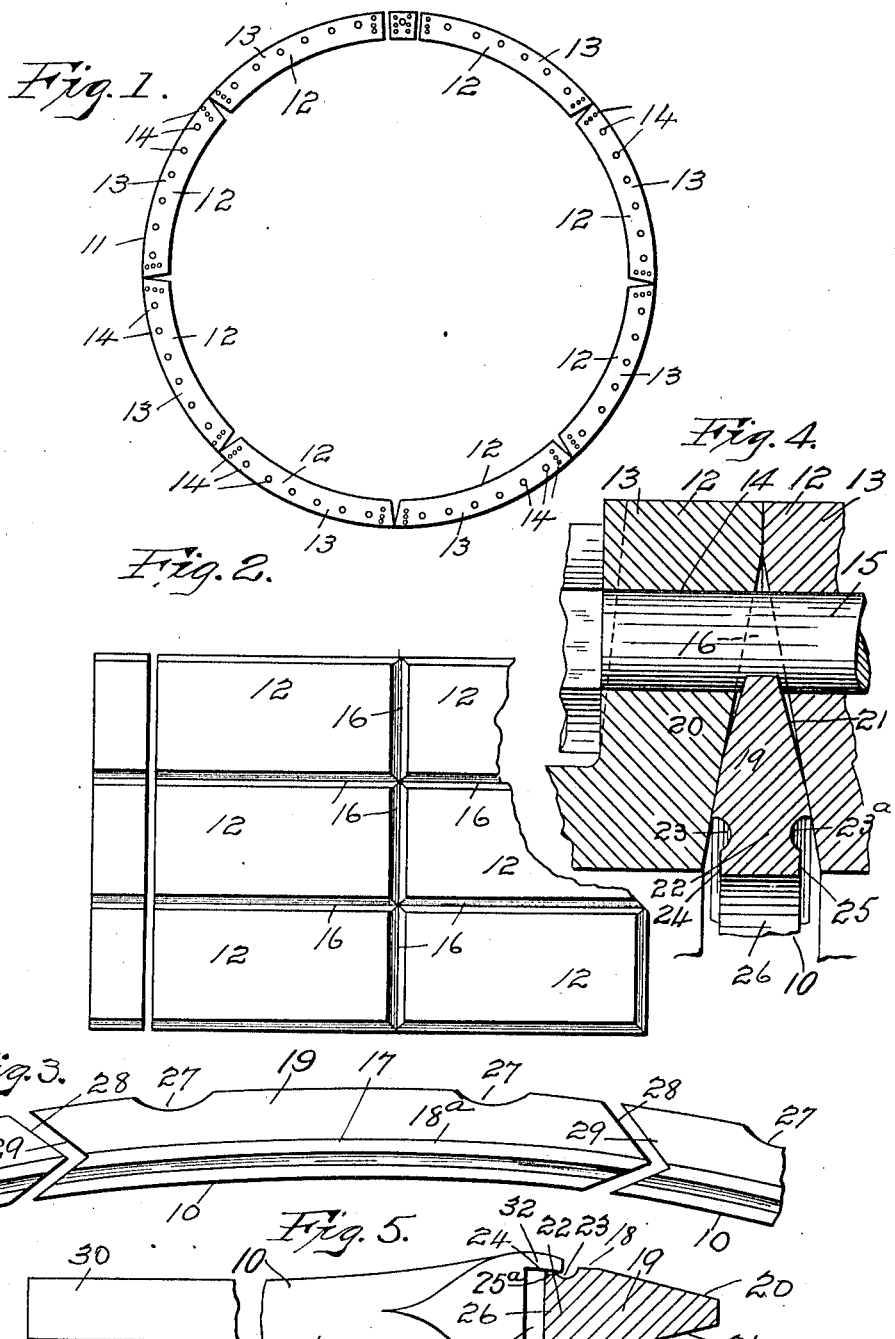

DANIEL A. OSGOOD, OF JERSEY CITY, NEW JERSEY.

CALKING DEVICE.

1,035,632.  Specification of Letters Patent.  Patented Aug. 13, 1912.

Application filed January 3, 1911. Serial No. 600,477.

*To all whom it may concern:*

Be it known that I, DANIEL A. OSGOOD, a citizen of the United States, and a resident of Jersey City, county of Hudson, and State of New Jersey, have invented certain new and useful Improvements in Calking Devices, of which the following is a full, clear, and exact specification.

This invention relates to a class of calks adapted more particularly for use in conjunction with the metallic tubes of tunnels for preventing water from passing through the joints thereof when the segmental parts are connected.

My invention has for its object primarily to provide a form of calking device which may be readily applied between the joints of the segments especially of metallic tubes of submarine tunnels and which is efficiently adapted to make said joints proof against the passage of water therethrough, thus overcoming the objections incidental to the methods at present in use which are ineffectual in accomplishing the desired purpose.

Another object of my invention is to provide a calking device of simple formation, economical to manufacture, and which may be constructed so as to be applied to connected tubes and pipes of various classes for making the joints thereof positively water-tight; and to provide a form of tool adaptable particularly for use in wedging the calks between the joints of the tubes and pipes.

A practical embodiment of the invention is represented in the accompanying drawing forming a part of this specification in which similar characters of reference indicate corresponding parts in all the views, the said invention being more fully described hereinafter and then pointed out in the appended claims.

In the drawings, Figure 1 is an end view of one form of tube or pipe employed in submarine tunnels. Fig. 2 is a plan, partly fragmentary, of the interior of a number of connected segments of a section of the tube or pipe. Fig. 3 is a side view of a number of my improved calks showing how the ends of the same intersect when fitted between the joints of a tube or pipe. Fig. 4 is an enlarged section showing one of the joints of two of the tubes as connected by a bolt and one of the calks when applied therebetween, and Fig. 5 is a section through the calk and a side view of the tool employed for wedging the calks in the joints, the same being centrally broken away.

In practice my calking device 10 is especially adapted to be applied to the forms of metallic tubes, as 11, which are used at present in the construction of marine subways or tunnels for travel therethrough of the cars of railroads and these tubes consist of a plurality of segments or divisional parts, as 12. Each of the segments 12 is substantially rectangular in shape and longitudinally curved so that when a sufficient number of the segments are assembled a circular tube or pipe will be formed. Along all of the edges of each of the curved rectangular segments 12 is provided a projecting flange, as 13, so disposed as to permit the flanges to be connected exteriorly of the tube during its construction. In the flanges 13 are formed a number of openings 14 through which are passed bolts, as 15 Fig. 4, for firmly joining the parts and, as shown, only the outer peripheral edges of said flanges are contacting when bolted together. By this arrangement a substantially V-shaped opening 16 is formed interiorly of the tube at all joints of the segments 12, and my calking devices when inserted therein are designed to effectually prevent water from leaking through said V-shaped openings.

I prefer to make the calks of my calking device of malleable iron though I may use any other metal or suitable material in constructing the calks as occasion requires. In calking the tube of a tunnel a plurality of the calks 10 are employed, and each device has an elongated body 17 which is curved to conform with the curvature of the segments 12 so as to snugly fit in the V-shaped openings 16 of the tube 11. The body 17 has opposed parallel edges, as 18 and 18$^a$, and a substantially cone-shaped elongated curved head 19 which is provided by tapering the opposite faces 20 and 21 lengthwise thereof. The calk 10 has a neck 22 formed by grooves 23 and 23$^a$ or by reducing the opposed lateral faces of the body 17 opposite to the head 19, and projecting from said neck is a hammer seat 24 having opposed parallel shoulders 25 and 25$^a$ and a transverse face 26. In the apex of the cone-shaped head 19 are formed at intervals a plurality of notches 27 which may be curved to conform with the shape of the bolts 15 and serve to prevent lateral displacement of the calks when inserted in the V-shaped openings 16 between the segments 12. One end of each of the calks 10 is tapered or of a V-shape, as at 28, in formation and the opposite end of each of said calks is cut-out to provide a V-shaped notch 29 so that all the calks will intersect and be held in interlocked engagement when arranged in the V-shaped openings 16.

For the purpose of supporting the calks 10 so as to be forced to proper positions in the V-shaped openings 16 I employ a tool or means, as 30, having a handle 31, upon one end of which are provided two spaced parallel projecting prongs 32 and 33, and between said prongs is a recess 34 in which the hammer-seat 26 is adapted to be seated. By the use of the supporting means 30 it is clear that the calk 10 may be held so as to be accurately directed when being driven into the V-shaped openings 16 by the force of a hammer or similar tool against the end of the supporting tool 30 opposite to the prongs 32 and 33.

In the foregoing description I have embodied the preferred form of my invention, but I do not wish to be understood as limiting myself thereto, as I am aware that modifications may be made therein without departing from the principle or sacrificing any of the advantages of this invention, therefore I reserve to myself the right to make such changes as fairly fall within the scope thereof.

Having thus described my invention, I claim as new and desire to secure by Letters Patent:

1. In a calking device of the character described; a calk consisting of an elongated curved body having a groove formed in each opposed lateral face thereof and by which a hammer-seat is provided upon one lengthwise part of said curved body.

2. In a calking device of the character described; a calk consisting of an elongated curved body having a groove formed in each opposed lateral face thereof; a substantially cone-shaped head formed upon the body; and a hammer-seat provided upon the body opposite to the cone-shaped head, said hammer-seat having two opposed parallel shoulders and a transverse face.

3. In a calking device of the character described; a calk consisting of an elongated curved body having tapered faces lengthwise thereof; a neck provided by a lengthwise groove formed in the opposed surface of the body opposite to the tapered faces; and a hammer seat provided upon the neck, said hammer seat having two opposed parallel shoulders and a transverse face.

4. In a calking device of the character described; a calk consisting of a substantially cone-shaped elongated curved head having a plurality of notches formed at intervals in the apex thereof and having a groove in each opposed face of the head opposite to said apex whereby two opposed parallel shoulders and a transverse face are provided opposite to said apex.

5. In a calking device of the character described; a calk consisting of an elongated curved body having a tapered end and a V-shaped notch formed in the opposite end thereof; a substantially cone-shaped elongated curved head provided upon the body and having a plurality of curved notches formed at intervals in the apex thereof; a neck formed by reducing the opposed surfaces of the body opposite to the curved cone-shaped head; and a hammer seat provided upon the neck and having two opposed shoulders and a transverse face.

6. In a calking device of the character described; in combination; a calk consisting of an elongated curved tapered body having a tapered end and a substantially V-shaped notch formed in the opposite end thereof, said body also having a plurality of curved notches formed at intervals in its tapered edge; a neck formed by reducing the opposed surfaces of the body opposite to the notched tapered edge; a hammer seat provided upon the neck; and means adapted to grip the hammer seat whereby the calk may be supported for calking the joints of the sections of a tube.

7. In a calking device of the character described; in combination; a calk consisting of an elongated curved body having a groove formed in each opposed lateral face thereof and by which a hammer seat is provided upon one lengthwise part of said curved body; and means adapted to support the hammer seat for positioning the calks in the joints of the sections of a tube.

8. In a calking device of the character described; in combination; a calk consisting of an elongated curved body having a part of each opposed lateral face thereof reduced, said body also having a tapered end and a notched opposite end; a substantially cone-shaped elongated curved head formed upon the opposite part of the body; and means adapted to support said body for positioning the calk in the joints of the sections of a tube.

9. In a calking device of the character described; in combination; a calk consisting of a substantially cone-shaped elongated curved body having a plurality of curved notches formed at intervals in the apex thereof, said body also having a substantially V-shaped end and a substantially V-shaped notched opposite end; and means adapted to support said body for positioning the calk in the joints of the sections of a tube.

10. In a calking device of the character described; in combination; a calk consisting of an elongated curved body having a tapered end and a V-shaped notched opposite end; a substantially cone-shaped elongated curved head provided upon the body and having a plurality of curved notches formed at intervals in the apex thereof; a neck formed by reducing the opposed surfaces of the body opposite to the curved cone-shaped head; whereby two opposed parallel shoulders and a transverse face are provided; and a tool having a handle and a notched end adapted to grip said shoulders to support the calk when being driven in the joints of the sections of a tube.

This specification signed and witnessed this thirty-first day of December A. D. 1910.

DANIEL A. OSGOOD.

Witnesses:
ROBT. B. ABBOTT,
S. SAHNER.

---

Copies of this patent may be obtained for five cents each, by addressing the "Commissioner of Patents, Washington, D. C."